though lignite char is the preferred carbon source, as it is a cheaper carbon source, and this type of char has been found to be surprisingly effective in the fluidized bed chlorination process.

United States Patent [19]
Bonsack

[11] 4,440,730
[45] Apr. 3, 1984

[54] CHLORINATION OF TITANIUM ORES USING LIGNITIC REACTIVE CARBONS

[75] Inventor: James P. Bonsack, Aberdeen, Md.

[73] Assignee: SCM Corporation, New York, N.Y.

[21] Appl. No.: 442,284

[22] Filed: Nov. 17, 1982

[51] Int. Cl.³ .............................................. C01G 23/02
[52] U.S. Cl. ........................................ 423/74; 423/62;
423/75; 423/76; 423/77; 423/78; 423/79
[58] Field of Search .................... 423/74, 75, 76, 79, 423/77, 78

[56] References Cited

U.S. PATENT DOCUMENTS

| | | | |
|---|---|---|---|
| 3,466,169 | 9/1969 | Nowak et al. | 75/112 |
| 3,897,537 | 7/1975 | Robinson et al. | 423/82 |
| 3,977,862 | 8/1976 | Glaeser | 75/1 T |
| 3,977,863 | 8/1976 | Glaeser | 75/1 T |
| 3,977,864 | 8/1976 | Glaeser | 75/1 T |
| 4,014,976 | 3/1977 | Adachi | 423/79 |
| 4,183,899 | 1/1980 | Bonsack | 423/76 |
| 4,279,871 | 7/1981 | Bonsack | 423/74 |
| 4,310,495 | 1/1982 | Bonsack | 423/76 |
| 4,329,322 | 5/1982 | Bonsack et al. | 423/76 |
| 4,343,775 | 8/1982 | Bonsack | 423/78 |

*Primary Examiner*—Herbert T. Carter
*Attorney, Agent, or Firm*—R. A. Sturges; M. H. Douthitt

[57] ABSTRACT

There is provided an improved process for the chlorination of particulate titaniferous ores using a particulate reactive carbon in a fluidized bed. The particulate reactive carbon is lignite char.

6 Claims, No Drawings

CHLORINATION OF TITANIUM ORES USING LIGNITIC REACTIVE CARBONS

This invention relates to the separation of titanium values from vanadium values in mixtures of titanium and vanadium chlorides.

BACKGROUND OF THE INVENTION

Titaniferous materials are often subjected to chlorination, as chlorination is an efficient and economical way to obtain a high purity titanium source for making titanium alloys, titanium compounds, and especially pigmentary titanium dioxide.

Several processes have been described in the art for the chlorination of titaniferous materials. Such processes generally react a titanium-containing raw material such as rutile or ilmenite ore, with a chlorine-providing material and a carbon-containing reductant according to one or both of the following equations:

$$TiO_2 + 2Cl_2(g) + C(s) \rightarrow TiCl_4(g) + CO_2(g)$$

$$TiO_2 + 2Cl_2(g) + 2C(s) \rightarrow TiCl_4(g) + 2CO(g)$$

Iron is a common impurity in titaniferous raw materials, and most chlorination processes are effective for simultaneously chlorinating the Ti and Fe values of these raw materials as shown in the following reactions:

$$2FeTiO_3 + 6Cl_2(g) + 3C(s) \rightarrow 2TiCl_4(g) + 3CO_2(g) + 2FeCl_2$$

$$FeTiO_3 + 3Cl_2(g) + 3C(s) \rightarrow TiCl_4(g) + 3CO(g) + FeCl_2$$

Chlorination reactions are generally carried out at about 1000° C., but can be carried out at any temperature in the range from about 400° C. to about 2000° C., using various carbon reductants and chlorine sources, including chlorine gas and chlorine-containing compounds. The titaniferous raw materials to be chlorinated can be preformed into briquets or the process can be conducted in a fluid bed using granular materials. When a fluid-bed process is used, generally the chlorine-providing material is supplied to the bottom of the bed and product titanium tetrachloride ($TiCl_4$) is removed from the top. Fluidization is generally controlled such that the bed remains fluidized and yet fine, solid particulate materials are not carried out with the product.

Selective chlorination processes also exist and are designed to chlorinate only the Ti values or the Fe values of the raw material. A carbon reductant and a chlorine source are used and reaction temperatures are similar to non-selective processes. However, selective processes utilize a chlorine source consisting at least partially of iron chlorides, react the titaniferous raw materials in a dilute phase, react the titaniferous raw materials at a specially high temperature, or a combination of the above.

Titanium raw materials such as rutile and ilmenite ores also usually contain vanadium compounds as impurities which adversely affect the titanium products produced. For example, pigmentary $TiO_2$ can tolerate only about 10 ppm. vanadium in the titanium tetrachloride from which the $TiO_2$ is made without discoloration. Removal of such impurities has heretofore been a complicated and burdensome process because of the similarity between the chemical and physical characteristics of titanium compounds and vanadium compounds. For example, $TiCl_4$ melts at −25° C. and boils at 136.4° C. and $VCl_4$ melts at −28° C. and boils at 148.5° C. This parallelism of properties permeates a comparison of the compounds of these two elements. Therefore, in the conventional chlorination process the vanadium values in a titaniferous raw material react in substantially the same manner as the titanium values, and their respective chlorinated products have nearly identical chemical and physical properties. Accordingly, it is extremely difficult to separate the undesirable chlorinated vanadium values from the desirable titanium values. Fractional distillation, for example, will remove most impurities from $TiCl_4$, but is ineffective for removing vanadium impurities.

Processes which are used commercially remove vanadium impurities from $TiCl_4$ by refluxing with copper, treating with $H_2S$ in the presence of a heavy metal soap, or treating with an alkali metal soap or oil to reduce vanadium impurities to a less volatile form. In each of these processes the treated $TiCl_4$ is then subjected to a further distillation. However, the organic materials used tend to decompose and deposit sticky, adhering coatings on heat exchanger surfaces, pipes, and vessel walls. This causes shutdowns of the process and requires frequent maintenance of the equipment.

In accordance with this invention, a simple, efficient, and economical process has now been discovered for separating the vanadium values from chlorinated titaniferous materials. The process of this invention utilizes a high surface area carbon for reacting with the titaniferous materials during the chlorination process. The use of the high surface area carbonaceous material causes the vanadium values present in the titaniferous material to be reduced to a less volatile form so that they can be easily removed as a solid from the gaseous or liquid $TiCl_4$ product.

One advantage of the present process is that it can be performed in existing equipment for the chlorination of titaniferous material. Another advantage is that it employs economical raw materials. Still another advantage is that the CO value of the tail gas produced is sufficiently enhanced such that said tail gases will support combustion and can be burned to effect complete conversion to $CO_2$ and thus eliminate the pollution problem they previously created. These and other advantages will become more apparent in the "Detailed Description of the Invention".

Another advantage of this invention is in the surprising beneficial effect of the kind of reactive carbon used in the fluid bed reaction. I have found that a lignite or brown coal char which is a reactive carbon, has an unusual charactertistic in that the surface area of the char remains unchanged or actually increases during use providing still better combustibility of the tail gas than heretofore available. Also the greater the surface area of the carbonaceous material in the bed, the more efficient the chlorination reaction.

When treated anthracite is used in the conventional fluid-bed chlorination of a titaniferous ore, the carbon surface area decreases to a stable equilibrium value. Reactivity is directly related to surface area. If the "as prepared" surface area is high enough, the equilibrium surface area will also be high enough to obtain good chlorination results as shown in Table I below. If the initial surface area of the carbon is lower, the CO level will be lower, and the vanadium impurity level will be higher as shown in Table II below. If the vanadium level is greater than 10 ppm, organic additives must be added to crude liquid TiCl₄ to assist in reducing the vanadium level below 10 ppm.

TABLE I

Using Steam Treated Anthracite
Surface Area 481 m²/g

| Chlorination Time, hrs. | 15.9 | 18.9 |
|---|---|---|
| Bed Carbon Surface Area*, m²/g | 125 | 130 |
| Average CO₂/CO Mole Ratio | 0.03 | 0.02 |
| Soluble V in Crude TiCl₄, ppm | — | 6 |

*Method A

TABLE II

Using Steam Treated Anthracite
Surface Area 160 m²/g

| Chlorination Time, Hrs. | 2.9 | 9.3 | 16.7 |
|---|---|---|---|
| Bed Carbon Surface Area*, m²/g | 37 | 21 | 21 |
| Average CO₂/CO Mole Ratio | 0.04 | 0.05 | 0.11 |
| Soluble V in Crude TiCl₄, ppm | 68 | 151 | 424 |

*Method A

Conventional fluid-bed chlorinations have been made using various carbons. Normally, low surface area carbons such as petroleum coke or bituminous coal char change very little in surface area during chlorination.

Contrary to the teachings of my prior U.S. Pat. Nos. 4,310,495 dated Jan. 12, 1982 and 4,329,322 dated May 11, 1982, instead of using a "high rank" coal char, e.g., anthracite, according to the present invention, I was surprised by the unexpected results that I got when a brown coal char was used. This material is derived from a low rank, lignitic ANSI/ASTM Class IV coal. The surface area of this carbon *increased* during chlorination as shown in Table III. Although the char had an "as prepared" surface area of only 30% of the treated anthracite in Table I, the char gave better chlorination results.

TABLE III

Using Australian Brown Coal Char
Surface Area 147 m²/g

| Chlorination Time, Hrs. | 4.0 | 13.6 | 20.2 |
|---|---|---|---|
| Bed Carbon Surface Area*, m²/g | 189 | 180 | 218 |
| Average CO₂/CO Mole Ratio | 0.005 | 0.010 | 0.014 |
| Soluble V in Crude TiCl₄, ppm | <0.5 | <0.5 | <0.5 |

*Method A

Brown coal char is available in large quantities in a size range suitable for fluid-bed chlorinators and at a cost that so far seems very attractive.

The relationship between carbonaceous source and surface area changes during chlorination was investigated further. I tried another ANSI/ASTM Class IV lignite-based carbon. As shown in Table IV, the surface area of this carbon also increased during chlorination. Very high CO levels and low vanadium impurity levels were observed as would be expected from the high equilibrium surface area of the bed carbon.

TABLE IV

Using a Lignite-Based Carbon
Surface Area 625 m²/g

| Chlorination Time, Hrs. | 3.0 | 10.9 | 15.0 | 27.5 |
|---|---|---|---|---|
| Bed Carbon Surface Area*, m²/g. | 878 | 856 | 899 | 1005 |
| Average CO₂/CO Mole Ratio | 0.003 | 0.002 | 0.002 | 0.002 |
| Soluble V in Crude TiCl₄, ppm. | <0.3 | <0.3 | <0.3 | <0.3 |

*Method A

The chemical and physical properties of reactive carbons are summarized in Table V.

TABLE V

| | Steam-Treated Anthracite | | Australian Brown Coal Char | Lignite-Based Carbon |
|---|---|---|---|---|
| | #1 | #2 | | |
| % C | 84.5 | 80.2 | 91.9 | 80.0 |
| % H | 0.7 | 0.5 | 0.9 | 0.8 |
| % Ash | 11.9 | 17.6 | 2.3 | 12.0 |
| % Volatile Matter | 0.8 | 1.1 | 5.6 | 6.6 |
| Nominal U.S. Standard Sieve Size | 6 × 50 | 6 × 50 | 8 × 35 | 12 × 20 |
| Surface Area, m²/g Method A | 160 | 481 | 147 | 625 |

The only change that this invention contemplates from the prior processes is in the carbonaceous material used. The disclosures of the foregoing U.S. patents are incorporated in toto herein by reference as disclosures of the processes in which the discovery hereof may be used.

The best lignite or brown coal char of which I am aware for use in the processes of my prior patents is a brown coal char produced by Australian Char Pty. Ltd. and sold under the name "Auschar".

The preferred char has the following typical properties:

| Physical Properties: | | |
|---|---|---|
| Average size | = | 0.5 to 2.3 mm |
| Specific Gravity | = | 1.2 |
| Porosity | = | 33% |
| Bulk Density | = | 640 kg/m³ |
| Proximate Analysis of Dry Char: | | |
| Ash | = | 2–3% |
| Volatile Matter | = | 2–5% |
| Fixed Carbon | = | 91–95% |
| Surface Area Measurement: | | |
| (by CO₂ absorption at 0° C.) about 750 m²/g | | |
| Ash Fusion Temperatures: | | |
| In oxidizing atmosphere | = | 1460° C. |
| In reducing atmosphere | = | 1400° C. |
| Gross dry calorific value | = | 7900 kilocalories/ kilogram |

NOTE: Other sizings are available to meet specific process needs.

Although Char is dry as it leaves the retort, it will pick up atmospheric moisture, and, after a time, may contain approximately 10% moisture. The figures quoted above are indicative of low volatile chars produced, and it should be noted that it is possible to vary the analysis to the extent of producing higher volatile materials when required.

| PROXIMATE ANALYSIS OF DRY CHAR (TYPICAL) | | | | | |
|---|---|---|---|---|---|
| Carbon | = | 94.5% | Calcium | = | 0.08% |
| Hydrogen | = | 1.1% | Magnesium | = | 0.24% |
| Nitrogen | = | 0.6% | Aluminum | = | 0.06% |
| Sulphur | = | 0.27% | Silicon | = | 0.05% |

-continued

| PROXIMATE ANALYSIS OF DRY CHAR (TYPICAL) | | | |
|---|---|---|---|
| Iron | = 0.33% | Sodium | = 0.11% | and traces of Chlorine, Sodium, Potassium, Phosphorous, Titanium and Copper

For details of raw lignite or brown coal, reference may be had to Kirk and Othmer "Encyclopedia of Chemical Technology", Third Edition, Vol. 14, pages 313–343.

The chlorination processes of the present invention are to be distinguished from the post-chlorination vanadium removal treatment using activated carbon made from lignite disclosed in my U.S. Pat. No. 4,279,871. In this process a high surface area activated carbon made from lignite is entrained in the chlorinated gaseous product stream as it leaves the hot fluid bed. Vanadium impurity levels are vastly reduced by this treatment. In the present process, chlorination is done in a fluid bed composed of lignite or brown coal char and the ore.

BRIEF STATEMENT OF THE INVENTION

Briefly stated, the present invention is an improvement on prior procedures for chlorinating a titaniferous ore or slag, e.g., rutile, Brookite or ilmenite wherein a low rank lignite or brown coal char is used in place of the prior high rank or anthracite char. The lignite or brown coal char is utilized in a fluid bed and comingled with particulate metalliferous ore, particularly a titaniferous ore, in the presence of a chlorinating agent, e.g., chlorine (which may be diluted with an inert gas, e.g., nitrogen). For such fluid bed operation said lignite or brown coal char as used in the processes hereof has a particle size in the range of about −6 mesh (U.S. Standard Screen Size) to about +140 mesh. The char is also characterized in that it initially has a microporous structure wherein from 30% to 95% of the surface area of the carbon is in micropores having a diameter of less than 20 Angstroms. Chlorination is carried out at a temperature in the range of 400° C. to 2000° C. or more specifically in the range of 800° C. to 2000° C., and particularly in the range of 1000° C. to 1600° C. until the metaliferous material is substantially chlorinated. Vanadium impurities contained in titaniferous ores can readily be removed substantially completely by a difference in extent of chlorination and consequent difference in boiling point which allows easy separation (See U.S. Pat. No. 4,329,322) of vanadium impurities by fractional condensation from the $TiCl_4$.

DETAILED DESCRIPTION OF THE INVENTION

As indicated above, this invention is an improvement in prior ore fluid bed chlorinating procedures wherein the high rank char is replaced with a low rank char. The processes with which the advantages of this invention may be realized include the following:

1. A low temperature chlorination process at from 400° C. to 800° C. in which a fluidized bed of ore and a porous carbon reductant having internal surface area due to pores of less than 20 Angstroms is reacted with a chlorine-containing gas. The process is disclosed in detail in my U.S. Pat. No. 4,310,495. At the very low temperatures (<600° C.) NOCl is used alone or with the gaseous chlorine. (See U.S. Pat. No. 2,761,760).

2. A high temperature chlorination process at from 800° C. to 2000° C. in which a fluidized bed or ore and a porous carbon reductant having an internal surface area of at least about 100 $m^2$/gm. of which at least about 10 $m^2$/gm. is in micropores having a pore diameter of less than 20 Angstroms is reacted with a chlorine-containing gas. This process is disclosed in my U.S. Pat. No. 4,329,322.

Chlorinations were made in a fused quartz fluid-bed reactor of 3 inch outside diameter, which had a porous quartz disc as a gas distributor. The reactor was held at a constant 1000° C. by an electrical furnace around the reaction zone. The hot offgas from the fluid bed passed through a cyclone separator held at about 175° C., where most entrained solids were removed. The offgas was further cooled by water-cooled and refrigerated condensers where essentially all remaining condensable vapors (mainly $TiCl_4$) were removed from $CO_2$, CO, and $N_2$, which were discharged to the atmosphere.

A mixture of carbon and −40 mesh rutile ore was initially charged into the reactor to give a 1 ft. static bed containing 32 wt % carbon. As the mass of the bed decreased due to the chlorination reaction, fresh carbon and ore were fed continuously to maintain a fairly constant bed mass. The bed mass was so controlled by adjusting the feed rate to maintain the measured pressure drop across the fluid bed constant. The carbon/ore ratio in the bed was held constant by adjusting the carbon/ore ratio in the feed to the carbon/ore ratio being consumed by chlorination. The consumed carbon/ore ratio was calculated from a $CO_2$ and CO analysis of the chlorinator offgas.

A mixture of 75 vol % $Cl_2$+25 vol % $N_2$ was metered to the reactor at a rate to provide a superficial fluidization velocity of 0.4 feet per second corrected for temperature and pressure.

The offgas was analyzed about every 20 minutes for $CO_2$, CO, and $N_2$ by gas chromatography.

At regular intervals, the reactor was shut down and allowed to cool. Samples of the +40 mesh bed material (carbon fraction) were then taken for surface area determination. Solids (which bypassed the cyclone due to its inefficiency) in the crude $TiCl_4$ were allowed to settle and a sample of the clear supernatant $TiCl_4$ was taken for vanadium analysis.

Surface areas were determined using two commercially available instruments. A Perkin-Elmer Shell Sorptometer Model 212B was used for rapid surface area determinations (Method A). A Digisorb 2500 Automatic Multi-gas Surface Area and Pore Volume Analyzer (Micromeritics Instrument Corp., Norcross, Georgia) was used for detailed surface texture studies (Method B).

I do not know why reactive carbons derived from Class I coals decrease in surface area and reactivity during chlorination, whereas carbons from Class IV coals (lignite or brown coal) do not show this decrease. Neither chemical composition, detailed surface texture analyses by Method B, nor X-ray diffraction reveals any property differences that could account for the difference in surface area stability.

There are differences in the structure of the carbon atom network, both in microscopic localized areas, and in the boundaries and interfaces between petrographic components (macerals). These differences in structure could influence the rate of pore closure and pore formation. Petrography of Class I and IV coals show them to be quite different. It is therefore reasonable to expect carbons derived from these two classes of coal to be different in this respect also.

Brown coal char has a surface texture quite similar to the treated anthracites. Treated anthracite carbons have most of their surface area within micropores of 20 Å diameter or less. The maximum pore diameter in these carbons is in the 20–60 Å range.

The carbon derived from lignite coal differs from the other carbons in surface texture. Most of the surface is within pores that are greater than 20 Å in diameter, and the maximum pore diameter is 450 Å.

Analysis of treated anthracite samples taken from equilibrium chlorinator beds shows that the surface area has decreased by 70 to 85% and that the microporosity has nearly disappeared.

In the lignitic carbons, the microporosity remains relatively stable as the carbon is consumed during chlorination, and there is a relatively large increase in pores greater than 20 Å in diameter.

A summary of surface texture data is given in Table VI.

Although lignitic carbons can have a surface texture that is similar or different when compared to anthracitic carbons, the surface texture of lignitic carbons changes during chlorination in a way distinct from anthracitic carbons.

TABLE VI*

|  | Steam-Treated Anthracite | | Australian Brown Coal | Lignite-Based |
| --- | --- | --- | --- | --- |
|  | #1 | #2 | Char | Carbon |
| A. As Prepared- Surface Area, m²/g | | | | |
| in <20 Å pores | 215 | 302 | 312 | 206 |
| in 20–600 Å pores | 10 | 124 | 22 | 382 |
| Total | 225 | 426 | 334 | 589 |
| Largest pores, Å dia. | 26 | 52 | 40 | 450 |
| B Carbon from Chlorinator Bed Surface Area, m²/g | | | | |
| in <20 Å pores | 17 | 45 | 271 | 275 |
| in 20–600 Å pores | 19 | 83 | 61 | 768 |
| Total | 36 | 128 | 332 | 1043 |
| Largest pores, Å dia. | 50 | 70 | 50 | 220 |
| Surface Area Change, % | −84. | −70. | 0. | +77. |

*All data via Method B

What is claimed is:

1. In a process for chlorinating a titaniferous material to form TiCl₄ wherein discrete particles of titaniferous material and discrete particles of porous carbon reductant having a particle size in the range of about −6 mesh +140 mesh characterized in that it has micropores therein having a pore diameter of less than about 20 Angstroms are fluidized and contacted with a chlorine providing material at a temperature of from 400° C. to 2000° C. until the titanium content of the titaniferous material is substantially chlorinated, the improvement which comprises utilizing as the porous carbon reductant a brown coal char or lignite based carbon characterized by a particle size in the range of about −6 mesh +140 mesh and having initially micropores therein having a pore diameter of about 20 Angstroms to the extent of from about 30% to about 95% of the total surface area of the carbon in said porous carbon reductant whereby vanadium values are substantially removed from the TiCl₄.

2. A process as defined in claim 1 wherein the temperature is from 400° C. to 800° C.

3. A process as defined in claim 1 wherein the temperature is from 800° C. to 2000° C.

4. A process as defined in claim 1 wherein the temperature is from 1000° C. to 1600° C.

5. A process as defined in claim 1 wherein the porous carbon reductant has an internal surface area of at least about 100 M²/gm.

6. A process as defined in claim 5 wherein at least about 10 m²/gram of the internal surface area is in micropores having a pore diameter of about 20 Angstroms or less.

* * * * *